US009372858B1

(12) United States Patent
Vagell et al.

(10) Patent No.: US 9,372,858 B1
(45) Date of Patent: Jun. 21, 2016

(54) SYSTEMS AND METHODS TO PRESENT AUTOMATED SUGGESTIONS IN A DOCUMENT

(71) Applicant: Google Inc., Mountain View, CA (US)

(72) Inventors: Vance Julius Vagell, Kew Gardens, NY (US); Peter James Solderitsch, Havertown, PA (US); Fil Zembowicz, New York, NY (US); Samuel Benjamin Messing, Brooklyn, NY (US); Luiz Do Amaral De Franca Pereira Filho, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 14/104,640

(22) Filed: Dec. 12, 2013

(51) Int. Cl.
*G06F 7/00* (2006.01)
*G06F 17/30* (2006.01)
*G06F 17/24* (2006.01)

(52) U.S. Cl.
CPC .......... *G06F 17/30011* (2013.01); *G06F 17/24* (2013.01)

(58) Field of Classification Search
CPC .............................. G06F 17/24; G06F 17/2288
See application file for complete search history.

(56) References Cited

U.S. PATENT DOCUMENTS

| 8,712,931 | B1* | 4/2014 | Wahlen ........................... 706/12 |
| 2001/0024497 | A1* | 9/2001 | Campbell et al. ......... 379/265.09 |
| 2004/0085354 | A1* | 5/2004 | Massand ....................... 345/751 |
| 2005/0283726 | A1* | 12/2005 | Lunati ........................... 715/533 |
| 2008/0027924 | A1* | 1/2008 | Hamilton et al. ................. 707/5 |
| 2011/0178981 | A1* | 7/2011 | Bowen et al. ................. 707/608 |
| 2011/0313757 | A1* | 12/2011 | Hoover et al. .................... 704/9 |
| 2012/0131015 | A1* | 5/2012 | Al Badrashiny et al. ..... 707/748 |
| 2012/0233554 | A1* | 9/2012 | Vagell et al. .................. 715/751 |
| 2013/0060560 | A1* | 3/2013 | Mahkovec et al. ................ 704/9 |

* cited by examiner

*Primary Examiner* — Marc Somers
(74) *Attorney, Agent, or Firm* — Ropes & Gray LLP

(57) ABSTRACT

A method for providing automated suggestions in a document stored on a cloud computing service includes providing collaborators with access to the document, who may each insert suggested edits into the document. The cloud computing service provides a plurality of suggestion robots for the collaborators to activate within the document, where each suggestion robot has an associated editing objective. The cloud computing service receives a request from a first collaborator to activate a first suggestion robot and activates the robot to present to the first collaborator a plurality of suggested edits of the document according to the editing objective of the robot, where the plurality of suggested edits by the first suggestion robot are displayed with any suggested edits by the one or more collaborators, and the first collaborator may accept or reject each of the plurality of suggested edits of the robot and the collaborators.

34 Claims, 8 Drawing Sheets

SYSTEMS AND METHODS TO PRESENT AUTOMATED SUGGESTIONS IN A DOCUMENT

BACKGROUND

Cloud computing services allow users to create, edit, share, and collaborate on files that are stored on the cloud computing service. Users connect to the cloud computing service over a remote network such as the Internet. Files that may be stored on the cloud computing service include word processing documents, spreadsheets, presentations, images, audio files, video files, and many other types of documents and files. The cloud computing service also provides document editing applications for displaying and editing certain files. These applications are sent from the cloud computing service to a client computer and displayed on a web browser executing the client computer. For example, a cloud computing service may send to a client computer a document editing application for displaying and editing word processing documents stored on the cloud computing service. For collaborative documents, the cloud computing service sends the application to each collaborator so that they can view and edit the document at the same time.

Each collaborator of a collaborative document stored on a cloud computing service may edit the document. A collaborator may also propose suggested edits of the document, which another collaborator may choose to accept or reject. For example, the main author of a collaborative document may request a collaborator to proofread the document. The collaborator inserts a number of suggested edits in the document for the main author to review. If the main author accepts a suggested edit, the suggested edit is incorporated into the document. If the main author rejects a suggested edit, the suggested edit is not incorporated into the document. It is useful for users to have other people review their documents and propose improvements, but it may be difficult to find a person to review a document in a timely manner. Also, human reviewers may miss instances where improvements may be made and may provide inconsistent suggestions.

SUMMARY

The systems and methods described herein provide a way for users to receive automated suggestions for documents stored on a cloud computing service. The document editing application provided to the user by the cloud computing service includes a user interface. The user interface provides options for users to select from a number of suggestion robots. Each suggestion robot has an editing objective. For example, one suggestion robot may check for internal consistency within the document while another suggestion robot may suggest formatting changes so that the document appears in a certain way. These suggestion robots are applications or scripts that are stored on the cloud computing service or a server hosted by a third party that has created the robot. When a user selects or activates a suggestion robot within the document, the suggestion robot inserts a number of suggested edits within the document according to its editing objective. The suggested edits generated by the suggestion robots are displayed with suggested edits by other collaborators of the document and may have the same appearance as suggested edits by the collaborators. The user may then review each suggested edit and either accept or reject the suggested edit.

One aspect described herein discloses a method for providing automated suggestions in a document stored on a cloud computing service. The method includes storing a document on a cloud computing service, providing one or more collaborators with access to the document, where the one or more collaborators may insert suggested edits into the document, and providing a plurality of suggestion robots for the one or more collaborators to activate within the document, where each of the plurality of suggestion robots has an associated editing objective. The method further includes receiving a request from a first collaborator on a client computer to activate a first suggestion robot within the plurality of suggestion robots and activating the first suggestion robot to present to the first collaborator a plurality of suggested edits of the document according to the editing objective of the first suggestion robot, where the plurality of suggested edits by the first suggestion robot are displayed with any suggested edits by the one or more collaborators, and the first collaborator may accept or reject each of the plurality of suggested edits of the first suggestion robot and the one or more collaborators.

Another aspect described herein discloses a method to request automated suggestions in a document stored on a cloud computing service. The method includes displaying, to a first collaborator on a client computer, a document stored on a cloud computing service, where one or more collaborators may insert suggested edits into the document, and displaying to the first collaborator a plurality of suggestion robots, where each of the plurality of suggestion robots has an associated editing objective. The method further includes receiving a request from the first collaborator to activate a first suggestion robot within the plurality of suggestion robots and displaying a plurality of suggested edits of the document generated by the first suggestion robot according to the editing objective of the first suggestion robot, where the plurality of suggested edits by the first suggestion robot are displayed with any suggested edits by the one or more collaborators, and the first collaborator may accept or reject each of the plurality of suggested edits of the first suggestion robot and the one or more collaborators.

Another aspect described herein discloses an apparatus for providing automated suggestions in a document stored on a cloud computing service, the apparatus including a server. The server is configured to communicate with a user and one or more collaborators on a plurality of client computers, store a document, provide the user and one or more collaborators with access to the document, where the one or more collaborators may insert suggested edits into the document, and provide a plurality of suggestion robots for the user to activate within the document, where each of the plurality of suggestion robots has an associated editing objective. The server is further configured to receive a request from the user on a first client computer in the plurality of client computers to activate a first suggestion robot within the plurality of suggestion robots and activate the first suggestion robot to present to the user a plurality of suggested edits of the document according to the editing objective of the first suggestion robot, where the plurality of suggested edits by the first suggestion robot are displayed with any suggested edits by the one or more collaborators, and the user may accept or reject each of the plurality of suggested edits of the first suggestion robot and the one or more collaborators.

Another aspect described herein discloses a system for providing automated suggestions in a document stored on a cloud computing service, the system including a plurality of client computers and a server. The server is configured to communicate with the plurality of client computers, store a document, provide a user and one or more collaborators on the plurality of client computers with access to the document, where the one or more collaborators may insert suggested edits into the document, and provide a plurality of suggestion robots for the user to activate within the document, where each of the plurality of suggestion robots has an associated editing objective. The server is further configured to receive a request from the user on a first client computer in the plurality of client computers to activate a first suggestion robot within the plurality of suggestion robots and activate the first suggestion robot to present to the user a plurality of suggested edits of the document according to the editing objective of the first suggestion robot, where the plurality of suggested edits by the first suggestion robot are displayed with any suggested edits by the one or more collaborators, and the user may accept or reject each of the plurality of suggested edits of the first suggestion robot and the one or more collaborators.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing users with suggestion robots that make automated suggested edits of documents stored on a cloud computing service. Suggestion robots may be designed with many different editing objectives, from improving the wording of a document to fact checking and formatting of documents. The suggestion robots may be developed by the cloud computing service or by third parties for use with the cloud computing service. The suggestion robots may be executed on the cloud computing service or a third-party server and the results displayed on the client computer, or the suggestion robot may be sent to the client computer and executed locally. The suggestion robots provide a number of suggested edits to the user, who may accept or reject each suggested edit. If the user accepts a suggested edit, the suggested edit is incorporated into the document. If the user rejects a suggested edit, the suggested edit is not incorporated into the document. The suggested edits generated by the suggestion robots are displayed with suggested edits by other collaborators of the document and may have the same appearance as suggested edits by the collaborators.

Figure 1:
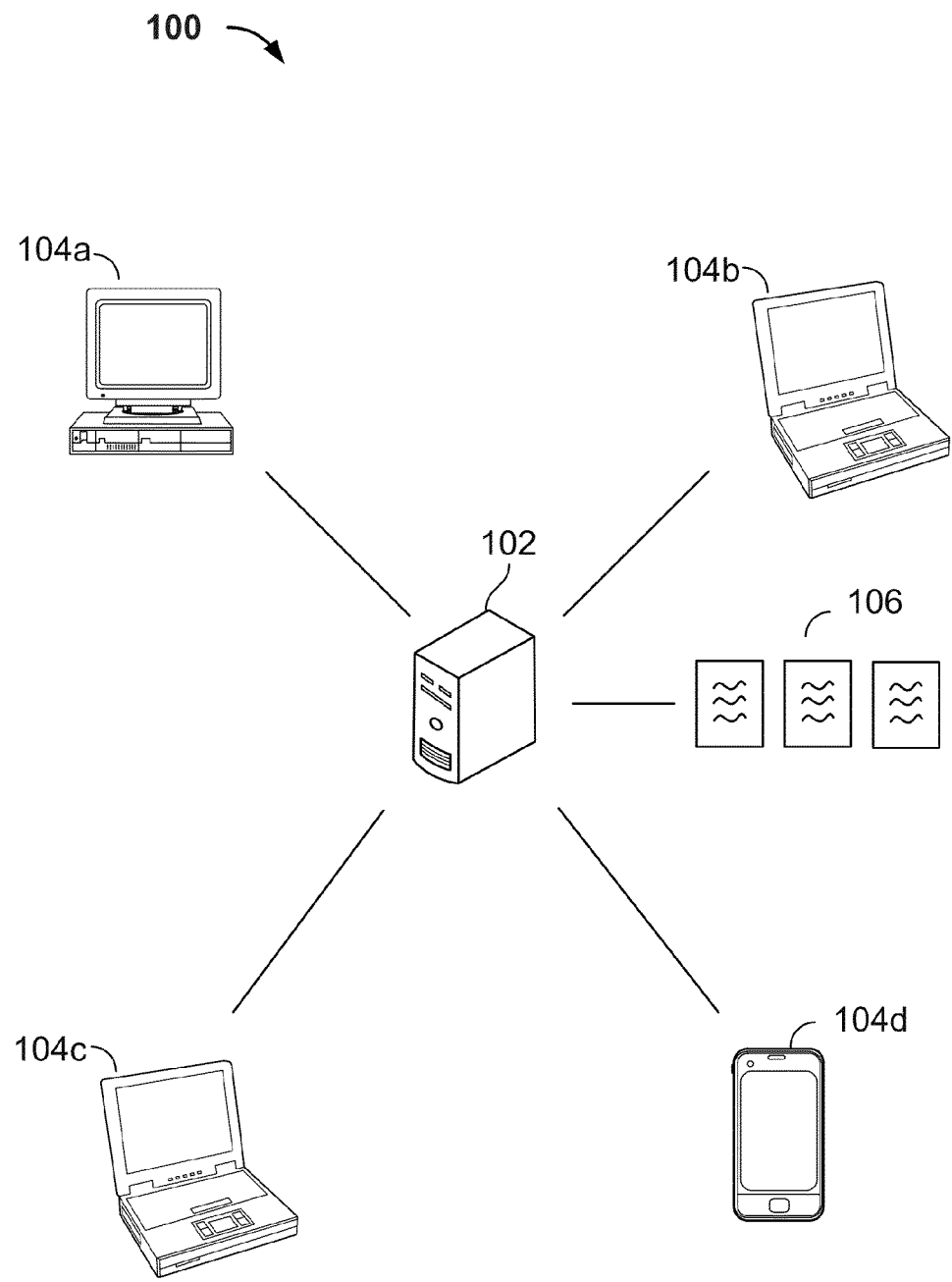
FIG. 1 shows a number of client computers in communication with a cloud computing service in accordance with an implementation as described herein.

First, a network system in which a number of client computers may connect to a server is described. FIG. 1 shows a network system 100 that includes cloud computing service 102 and a number of client computers 104a through 104d. Cloud computing service 102 may include one or more computing devices that collectively provide online content and services for a number of client computers. Cloud computing service stores a number of files 106 accessible by client computers 104a-104d. The files may include word processing documents, spreadsheets, presentations, images, audio files, video files, or any other files of various open or proprietary file types. Users may create, edit, copy, share, and delete files stored on the cloud computing service. Client computers 104a-104d may include desktop computers, laptop computers, tablets, smart phones, mobile electronic devices, or any other device that may connect to cloud computing service 102. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
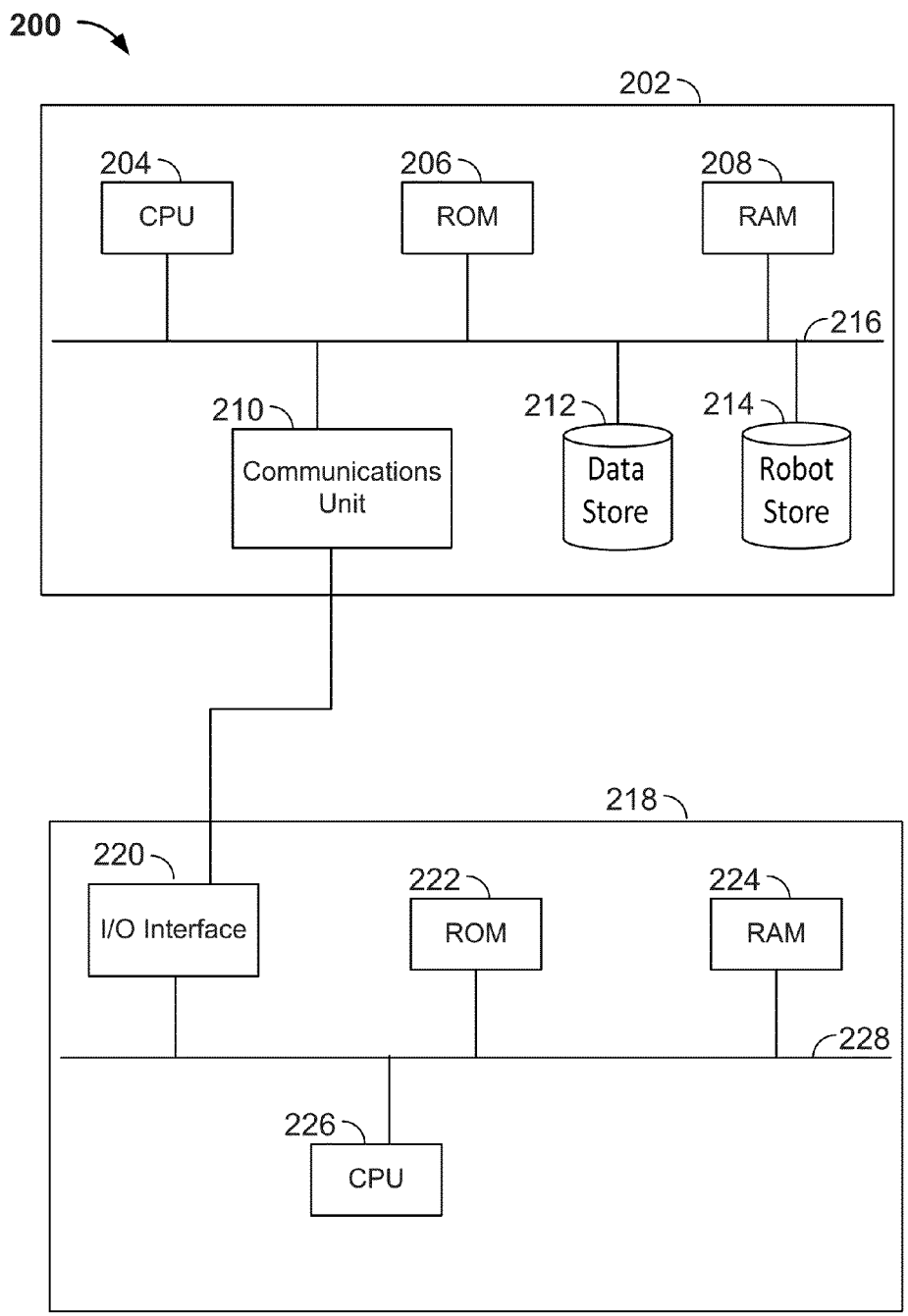
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 218. Cloud computing service 202 includes a central processing unit (CPU) 204, read-only memory (ROM) 206, random access memory (RAM) 208, communications unit 210, data store 212, robot store 214, and bus 216. Server 202 may have additional components that are not illustrated in FIG. 2. Bus 216 allows the various components of server 202 to communicate with each other. Communications unit 210 allows server 202 to communicate with other devices, such as client computer 218 and other client computers, as well as third-party servers. Data store 212 is used to store content accessible by a user on client computer 218, such as documents and files stored by users on cloud computing service 202. Robot store 214 stores suggestion robots that are designed for use within the documents stored in data store 212. Cloud computing service 202 may provide client computer 218 with a document editing application for displaying and editing a document stored in data store 212. Alternatively, a user on client computer 218 may obtain the document editing application from a web page, such as a website selling electronic applications. The document editing application also provides options for a user to activate a suggestion robot stored in robot store 212. Alternatively, cloud computing service 202 may send one or more suggestion robots to client computer 218. When a suggestion robot is activated by the user, the suggestion robot executes on cloud computing service 202 (or locally on client computer 218) and generates a number of suggested edits within the document. These suggested edits are displayed to the user on client computer 218, who may choose to accept or reject each suggested edit.

Client computer 218 includes a CPU 226, ROM 222, RAM 224, input/output interface 220, and bus 228. Client computer 218 may have additional components that are not illustrated in FIG. 2. Bus 228 allows the various components of client computer 218 to communicate with each other. Input/output interface 220 allows client computer 218 to communicate with other devices, such as cloud computing service 202 and other third-party servers. Input/output interface 220 also includes devices for taking in user inputs and displaying outputs to a user, such as a keyboard, mouse, and display screen. CPU 226 executes various programs stored in memory on client computer 218, such as a web browser. Web browsers are used, among other things, to display content and services provided by cloud computing service 202 such as a document editing application configured to display a document stored on cloud computing service 202 to the user. Web browsers receive web page documents encoded in HTML, CSS, Javascript, or other web-compatible languages and interpret the language to properly display the web page.

Data store 212 for storing content on cloud computing service 202, robot store 214, a web browser executing on client computer 218, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

Figure 3:
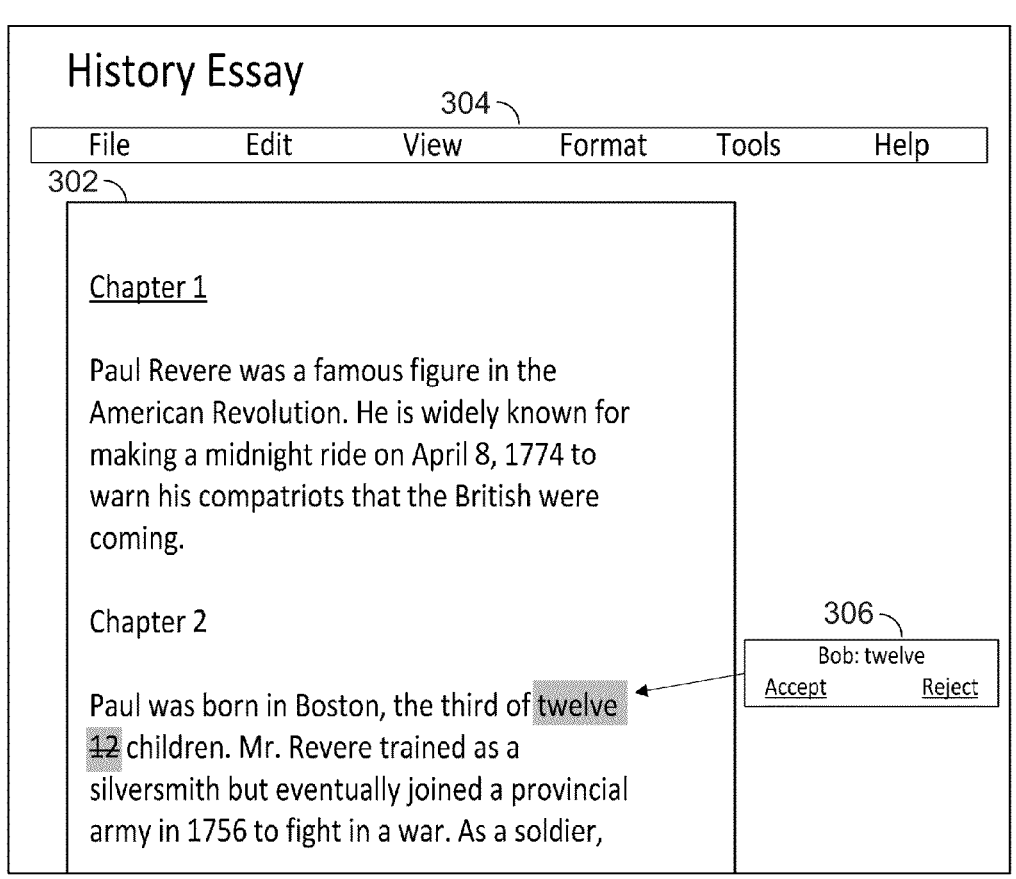
FIG. 3 shows a user interface for displaying a document stored on a cloud computing service in accordance with an implementation as described herein.

A cloud computing service stores documents accessible to users on client computers. Users may access the documents using a web browser on a client computer. The cloud computing service provides a document editing application that is sent to the client computer. The document editing application is executed within the web browser and includes a user interface for a user to view and edit the document. FIG. 3 shows an example of a user interface 300 for a document editing application provided by a cloud computing service. User interface 300 includes a display of the contents of document 302 with title "History Essay", as well as menu 304. Menu 304 provides the user with a number of options for viewing and editing the document, such as copy and paste, save, print, share, or zoom. The formatting and layout of user interface 300 is not limited to what is shown in FIG. 3.

Document 302 may be collaborative, which means that more than one user may view and edit the document at the same time. A number of collaborators may have access to document 302. Document 302 has an access control list that stores the users that are allowed to access document 302 and each user's access level. For example, some users are allowed to edit document 302, while others may only insert comments or suggested edits in document 302, and others may only be allowed to view document 302 and cannot view any suggested edits. A collaborator may create and insert suggested edits within document 302 which another collaborator may accept or reject. Unlike actual edits that change the document, suggested edits are not incorporated into a document until they have been accepted. However, the user interface may show a preview of how the suggested edit would look like if accepted. User interface 300 includes an example of a suggested edit 306 made by a collaborator named Bob. Suggested edit 306 includes a display box that presents the suggested edit. In this case, it is a suggestion to change the numerals "12" to the word "twelve" and the user interface previews the suggested edit by inserting "twelves" and striking out "12" in the text. Suggested edit 306 also indicates who made the suggested edit (Bob), and includes options for the user to either accept or reject the suggested edit. If the user accepts suggested edit 306, then numerals "12" are changed to the word "twelve" in document 302, while no changes are made if the user rejects suggested edit 306. Suggested edit 306 also includes an arrow pointing to a highlighted section of document 302 that may be affected by the suggested edit. The display of suggested edit 306 is not limited to what is shown in FIG. 3. Additional information regarding suggested edits may be found in copending, commonly-assigned U.S. application Ser. No. 14/060,059, entitled "SYSTEMS AND METHODS FOR PROVIDING JUST-IN-TIME PREVIEW OF SUGGESTION RESOLUTIONS" which is hereby incorporated by reference in its entirety.

Suggested edits may be used by reviewers or editors to propose improvements to a document while allowing the user to retain control over which suggested edits to incorporate into the document. While it is very useful to have human reviewers review a document, it may be difficult for a user to find someone to review the document and do so within a certain time frame. The systems and methods described herein provide a way for users to obtain suggested edits from an automated reviewer. A cloud computing service provides a number of programs or scripts that scan the document and generate suggested edits for the user to review. These programs are called suggestion robots. Each suggestion robot has an editing objective, so that each suggested edit made by a suggestion robot is related to the same objective. For example, the editing objective of one suggestion robot may be to suggest edits for converting verbs into present tense while the editing objective of another suggestion robot may be to suggest edits for converting verbs into past tense. Other examples of editing objectives of suggestion robots may include spelling and grammar in various languages, improvement of wording, consistency within the document, creating shortcuts in a document, adding web links to a document, formatting, visual style, color schemes, inserting images associated with words, fact checking, bibliography checking, inviting additional human reviewers based on mention of their names, suggestions for particular styles of prose or poetry, and humorous suggestions. Suggestion robots may be divided into categories based on their editing objectives, and some robots may have varying or opposing editing objectives within the same category. The editing objective of a suggestion robot is usually subjective in nature, i.e. suggesting improvements for a user to consider rather than correcting obvious or likely errors, which may be corrected automatically without the use of a suggestion robot. However, suggestion robots may also make objective suggested edits to correct errors.

Suggestion robots may consult external sources, such as a dictionary or database, to generate edits. The suggested edits may be based on hard-coded heuristics in the suggestion robot, or may be based on machine learning on a corpus of high quality documents and other written content. Suggestion robots may also adjust suggestions based on previous user acceptance/rejection patterns. For example, if a user repeatedly rejects a certain type of suggested edit, the suggestion robot may stop presenting the same type of suggested edit to the user. Past user acceptance/rejection patterns may be stored in document metadata on the cloud computing service. The suggestion robot uses this information when generating suggested edits for that user. A user may apply one or more suggestion robots to a document according to the user's preference of editing objectives that the user believes will improve the document.

A user may apply a suggestion robot to all or a part of a document, or to multiple documents at the same time. For example, the user may highlight a sentence or a paragraph of text and apply a suggestion robot to review only the highlighted section of text. In another example, the user may select several documents and apply a suggestion robot to each one simultaneously. The suggestion robots may be activated on a one-time basis to generate suggested edits for the user to review. Alternatively, the user may opt to have some suggestion robots continually "on" as a user edits a document so that the suggestion robots generate suggested edits in real-time, with an appropriate lag between when the user creates content and when the suggestion robots review that content. Collaborators of the document, if they have the requisite permissions on the document, may also apply suggestion robots to the document in lieu of or in addition to any suggested edits the collaborators insert. Other collaborators, if they have the requisite permissions, may view and accept or reject the suggested edits. The suggested edits inserted by the suggestion robots may have the same appearance as suggested edits inserted by any collaborator. The suggested edits generated by each suggestion robot or collaborator may be displayed in different colors, fonts, or other characteristics to uniquely identify the suggestor, but all suggested edits may be displayed in the same format and manner. The same interface and tools, such as searching within suggested edits, bulk resolution of suggested edits, and filtering of suggested edits, may be applied to all suggested edits, whether by a suggestion robot or a human reviewer. The suggestion robots may be developed by the cloud computing service or by a third party for use within the document editing application provided by the cloud computing service. The suggestion robots may be programmed in Javascript or other browser-compatible languages, or may be programmed as modules in Java, C++, and any other languages executable on a server. The suggestion robots may also be written in the native code of certain mobile devices. The suggestion robots are considered modular applications, or applications that operate within another application, which in this case is the document editing application.

Figure 4:
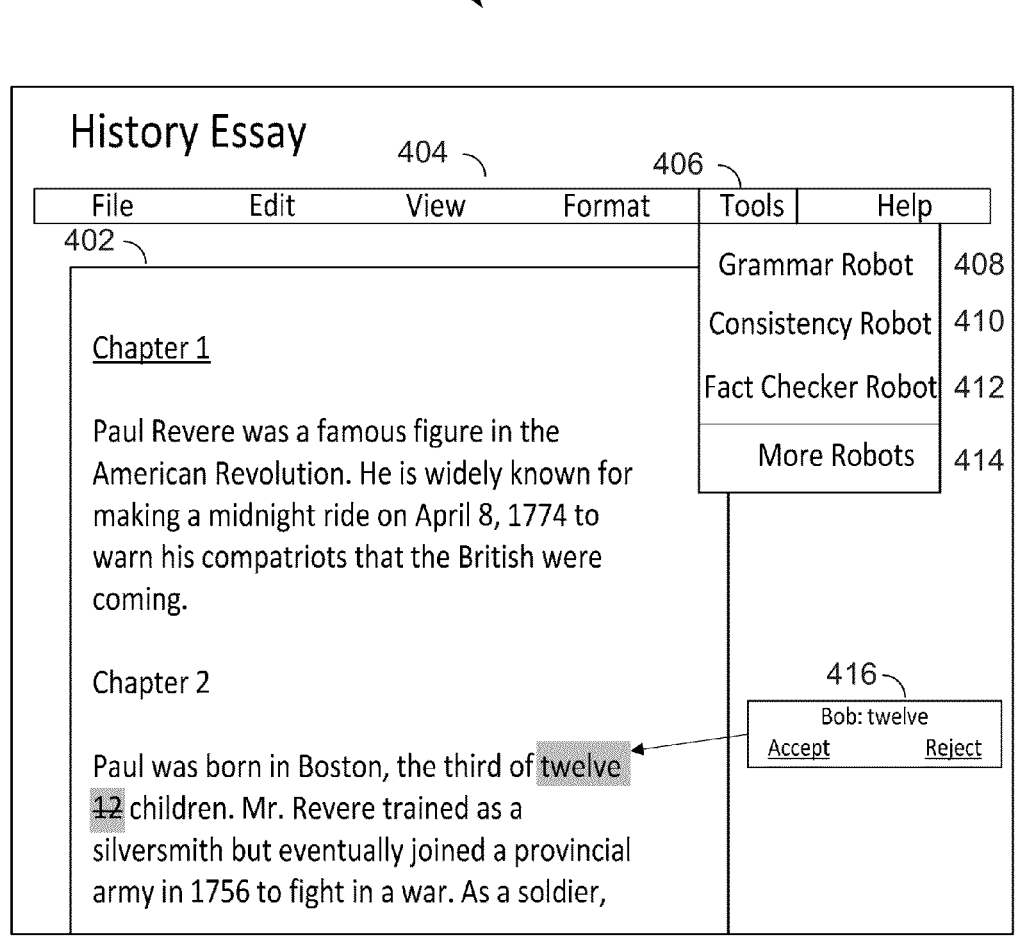
FIG. 4 shows a user interface for providing users with an option to activate a suggestion robot within a document stored on a cloud computing service in accordance with an implementation as described herein.

The document editing application provided by the cloud computing service has a user interface that allows users to browse, search, and activate suggestion robots for a document. FIG. 4 shows an example of a user interface 400 for a document editing application provided by a cloud computing service. User interface 400 includes a display of the contents of document 402, including suggested edit 416 made by collaborator Bob. User interface 400 also includes menu 404, which has a number of menu categories displaying various functions for the user. Menu 404 includes a "Tools" menu category 406 that allows a user to search, browser and activate suggestion robots. The formatting and layout of user interface 400 is not limited to what is shown in FIG. 4. For example, menu category 406 may be labeled with another name or the suggestion robots may be found under another category of menu 404.

Menu category 406 displays three suggestion robots, Grammar Robot 408, Consistency Robot 410, and Fact Checker Robot 412. These suggestion robots may be displayed because the user has recently used the robots, or the user has indicated that these suggestion robots are the user's favorite, or may have been suggested to the user by the cloud computing service. Menu category 406 also includes a "More Robots" option 414, which may open a window overlaying user interface 400 that allows the user to browse and search for more suggestion robots. The suggestion robots in FIG. 4 are configured to operate within the document editing application provided by the cloud computing service.

Figure 5:
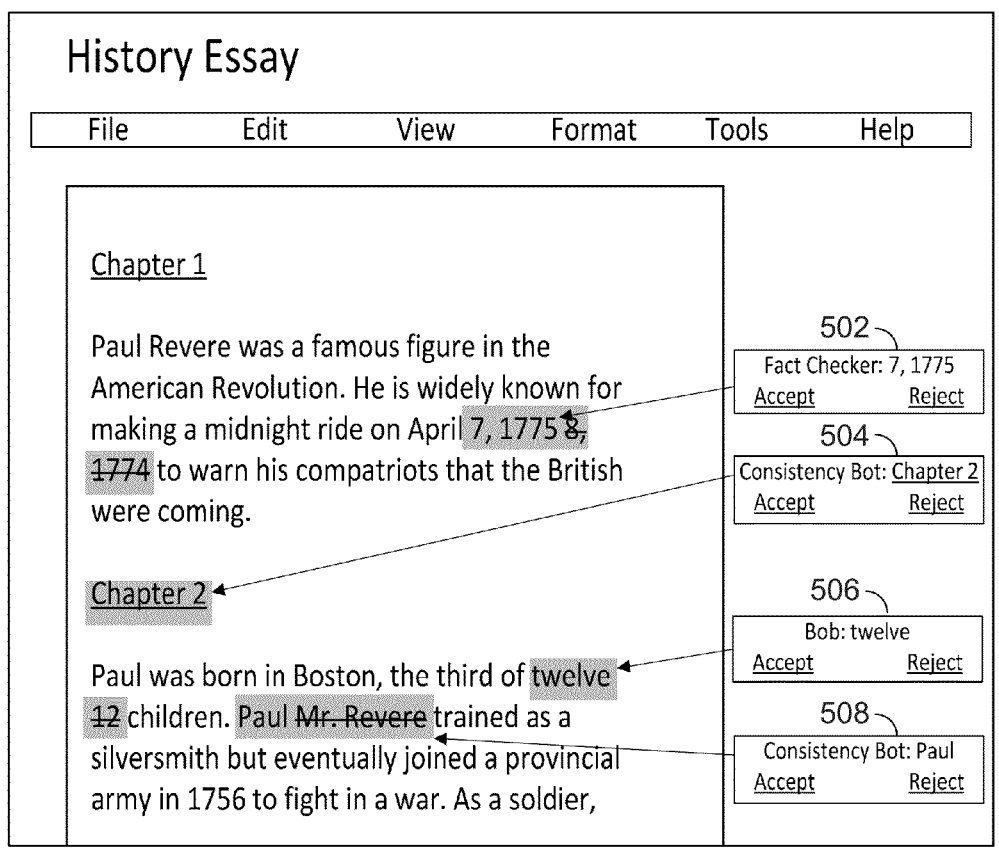
FIG. 5 shows a user interface for displaying suggested edits generated by a suggestion robot in accordance with an implementation as described herein.

A user may activate a suggestion robot by selecting it from menu category 406. Alternatively, a user may activate a suggestion robot through e-mail. A suggestion robot may have an associated e-mail address. A user sends the document to the e-mail address of the suggestion robot. The suggestion robot inserts suggested edits into the copy of the document stored on the cloud computing service and notifies the user that the suggestion robot has finished. The user may then open the document to view the suggested edits. When the user activates a suggestion robot, it executes and inserts a number of suggested edits into document 402. For example, the user decided to activate Consistency Robot 410 and Fact Checker Robot 412 in document 402. An example of the result is shown in FIG. 5, where user interface 500 displays the suggested edits generated by the Consistency Robot and Fact Checker Robot, in addition to suggested edit 506 by collaborator Bob. The Consistency Robot generated two suggested edits: edit 504 to underline "Chapter 2" so that it is consistent with the formatting for "Chapter 1" and edit 508 to change "Mr. Revere" to "Paul" so that it is consistent with an earlier reference to the same person. The Fact Checker Robot generated one suggested edit: edit 502 to change "Apr. 8, 1774" to "Apr. 7, 1775" in order to correct the date of an historical event. The suggestion robot may suggest multiple alternatives for the same highlighted section of text, and the user may select from those alternatives or reject all of them. Each of suggested edits 502 through 508 identify the person or robot that made the suggestion and give the user the option to either accept or reject the suggested edit. The suggested edits generated by the suggestion robots may have the same appearance as suggested edits made by human collaborators such as Bob. Thus from the user's perspective, suggested edits made by a suggestion robot are no different than suggested edits made by human collaborators. The user may search, filter by type of suggested edit or identity of the editor, resolve suggested edits in bulk, and apply other commands to any set of suggested edits regardless of whether they were generated by a human or a suggestion robot.

Figure 6:
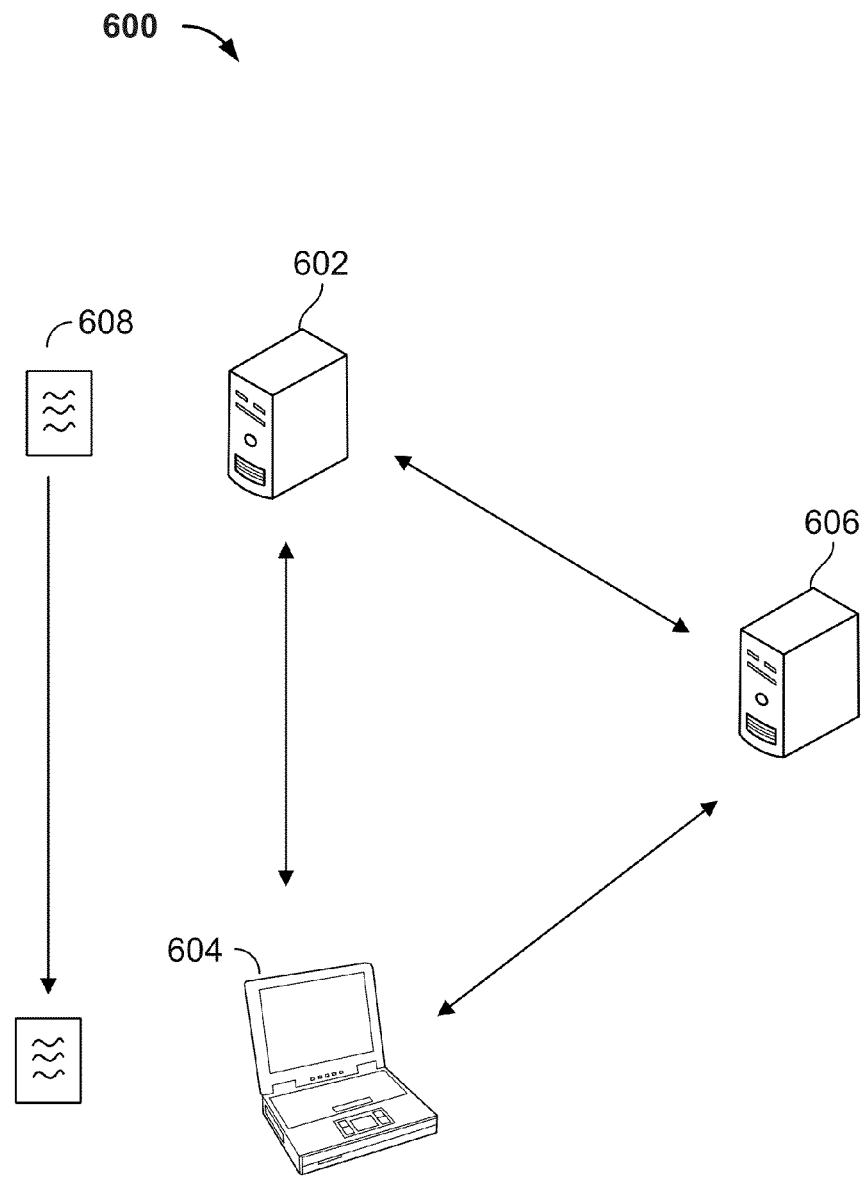
FIG. 6 shows a client computer in communication with a cloud computing service and a third-party server in accordance with an implementation as described herein.

Suggestion robots may be stored and executed in a number of ways. FIG. 6 shows an example of a system 600 that illustrates where the suggestion robots may be stored and executed. System 600 includes cloud computing service 602 in communication with client computer 604. Cloud computing service 602 and client computer 604 are both in communication with a third party server 606. All three are in communication over a remote network such as the Internet. Cloud computing service 602 stores a document 608 which is accessible to a user on client computer 604. Cloud computing service 602 provides document 608 and a document editing application for displaying the document in a web browser executing on client computer 604.

Cloud computing service 602 stores a number of suggestion robots that may be activated in document 608. Third-party server 606 may also create additional suggestion robots that work in conjunction with the document editing application provided by cloud computing service 602. Third-party server 606 may use a special application programming interface (API) provided by cloud computing service 602 to design suggestion robots that work within the document editing application provided by cloud computing service 602. Cloud computing service 602 may store a suggestion robot registry which contains information about suggestion robots developed by third parties such as third-party server 606. The information may include a unique ID for each suggestion robot, the name of the suggestion robot, the identity of the third party that developed it, and in some cases a URL or other type of address (e.g. IP) for connecting with the third party to initiate the suggestion robot. The suggestion robots designed by third-party server 606 may be stored on third-party server 606, or a copy may also be stored on cloud computing service 602. The document editing application provided to client computer 604 allows users to search, browse, and use suggestion robots developed by both cloud computing service 602 and third-party server 606.

When a user on client computer 604 activates a suggestion robot stored on cloud computing service 602, the suggestion robot may be executed on cloud computing service 602 and the results provided to the document editing application on client computer 604 for display. Alternatively, cloud computing service 602 may send a local copy of the suggestion robot to client computer 604 so that the suggestion robot is executed locally on client computer 604. When the user activates a suggestion robot stored on third-party server 606, cloud computing service 602 or client computer 604 may connect with third-party server 606 to initiate the execution of the suggestion robots. The suggestion robot is then executed on third-party server 606 and the results are sent to client computer 604 for display. Alternatively, third-party server 606 may send a local copy of the suggestion robot to client computer 604 so that the suggestion robot is executed locally on client computer 604. Suggestion robots designed by a third-party and stored on third-party server 606 may utilize the acceptance/rejection pattern of users to adjust the suggested edits, but may not be able to access the document metadata on cloud computing service 602 directly for this information. Instead, cloud computing service 602 sends information to third-party server 606 regarding user decisions so that third-party server 606 may store this information independently.

Figure 7:
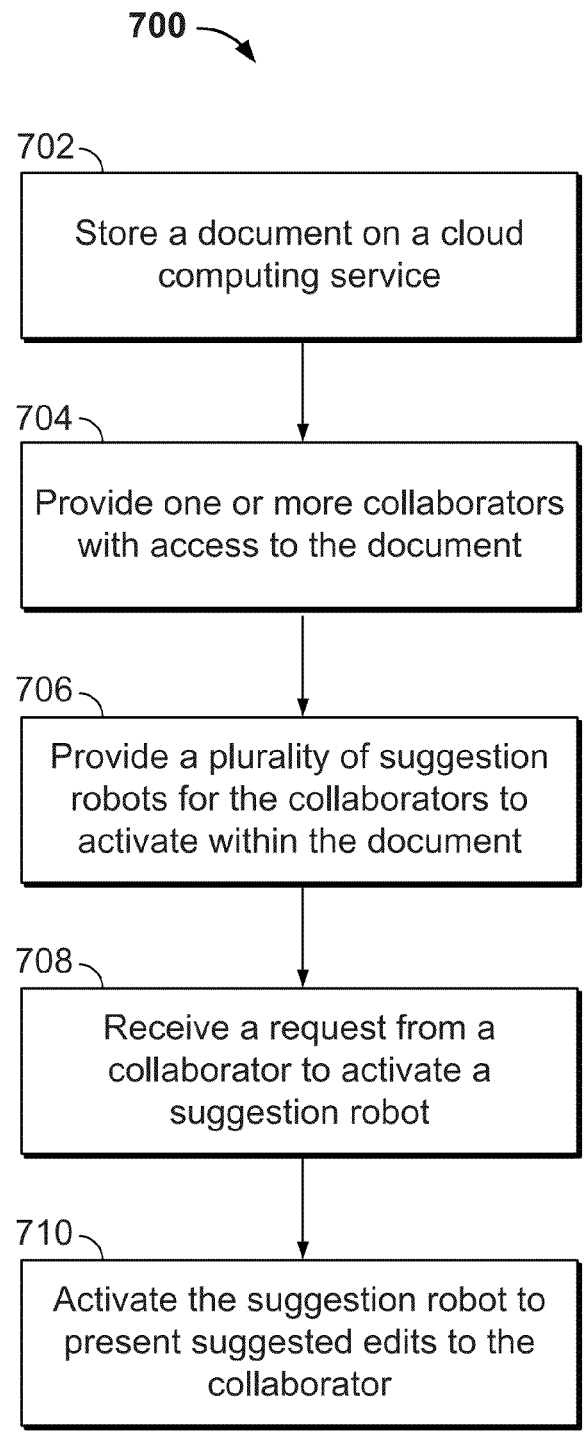
FIG. 7 shows a method for providing automated suggestions in a document stored on a cloud computing service in accordance with an implementation as described herein.

Methods for providing automated suggestion robots to users of a cloud computing service are now described. FIG. 7 illustrates a method 700 for a cloud computing service to provide automated suggestions in a document stored on the cloud computing service. The method includes storing a document on a cloud computing service and providing one or more collaborators with access to the document, where the one or more collaborators may insert suggested edits into the document. The method further includes providing a plurality of suggestion robots for the one or more collaborators to activate within the document, where each of the plurality of suggestion robots has an associated editing objective, and receiving a request from a first collaborator on a client computer to activate a first suggestion robot within the plurality of suggestion robots. The method further includes activating the first suggestion robot to present to the first collaborator a plurality of suggested edits of the document according to the editing objective of the first suggestion robot, where the plurality of suggested edits by the first suggestion robot are displayed with any suggested edits by the one or more collaborators and the first collaborator may accept or reject each of the plurality of suggested edits of the first suggestion robot and the one or more collaborators. Method 700 may be performed on a cloud computing service, such as cloud computing service 102 in FIG. 1, cloud computing service 202 in FIG. 2, and cloud computing service 602 in FIG. 6.

Method 700 begins by storing a document on a cloud computing service, shown at 702. The cloud computing service stores many documents that are accessible to client computers through a remote network, such as the Internet. The cloud computing service also stores a document editing application that executes within a web browser on the client computer to display the document to users. Alternatively, the document editing application may be a stand-alone application that executes on the client computer without the need for a web browser. The document stored may be a word processing document, spreadsheet, presentation, or any other electronic file. The cloud computing service then provides one or more collaborators with access to the document, shown at 704. The collaborators may each insert suggested edits into the document. Suggested edits are edits that are not incorporated into the document until a user accepts them. However, the user interface may show a preview of how the suggested edit would look like if accepted. An example of a suggested edit generated by a collaborator is shown in FIG. 3, and the display of the suggested edit in the document editing application may include the suggested edit, the person who suggested the edit, and accept and reject options. The document has an access control list that controls the level of access each collaborator has to the document. For example, if a collaborator has creator, editor, or commenter access then the collaborator may insert suggested edits in the document. Collaborators with only viewing access may not insert or view suggested edits.

The cloud computing service also provides a plurality of suggestion robots, shown at 706, for the one or more collaborators to activate within the document. Each suggestion robot generates suggested edits for a document according to an associated editing objective. Examples of editing objectives include spelling and grammar in various languages, improvement of wording, consistency within the document, creating shortcuts in a document, adding web links to a document, formatting, visual style, color schemes, inserting images associated with words, fact checking, bibliography checking, inviting additional human reviewers based on mention of their names, suggestions for particular styles of prose or poetry, and humorous suggestions. The suggestion robots may be stored on the cloud computing service or stored on a third-party server. The suggestion robots may be programmed in Javascript or other browser-compatible languages, or may be programmed as modules in Java, C++, and any other languages executable on a server. The suggestion robots may also be written in the native code of certain mobile devices. The suggestion robot may be designed with hard-coded heuristics to generate suggested edits, or may use machine learning to train the robot on a corpus of documents. The suggestion robots may consult external sources to generate the suggested edits, and may also keep track of the user's acceptance and rejection patterns. The user interface of the document editing application displays options for the collaborators to activate any of the suggestion robots. An example of a user interface for displaying, searching, and browsing the suggestion robots to collaborators is shown in FIG. 4. A collaborator may activate a first suggestion robot in the plurality of suggestion robots by selecting it on the user interface. Alternatively, a collaborator may activate a suggestion robot through other means, such as providing an e-mail address for the collaborator to send the document. When a collaborator activates the first suggestion robot, the cloud computing service receives a request to activate the first suggestion robot, shown at 708. The collaborator may activate the first suggestion robot to provide suggested edits for all or a portion of a document (e.g. only a portion of the document highlighted by the collaborator), or for more than one document at the same time. The collaborator selection is communicated from the client computer to the cloud computing service.

After the cloud computing service receives the request to activate the first suggestion robot, the cloud computing service activates the first suggestion robot to present to the collaborator a plurality of suggested edits of the document according to the editing objective of the first suggestion robot, shown at 710. For example, if the editing objective of the first suggestion robot is to convert all verbs into past tense, then the suggested edits may be instances where the suggestion robot has found present and future verb tenses and suggests the past tense for those verbs. A suggested edit may have multiple alternatives that the collaborator selects from. The first suggestion robot may be executed on the cloud computing service and the plurality of suggested edits are sent to the client computer for display, or a copy of the suggestion robot may be sent to the client computer for execution. If the first suggestion robot is stored on a third-party server, it may be executed on the third-party server and the plurality of suggested edits are sent to the client computer for display. The plurality of suggested edits generated by the suggestion robot is displayed along with any suggested edits by collaborators. The display of the plurality of suggested edits may have the same appearance as the display of suggested edits by the other collaborators, such as shown in FIG. 5. From the collaborator's perspective, suggested edits made by a suggestion robot are no different than suggested edits made by human collaborators. In addition, the collaborator may accept or reject each of the plurality of suggested edits of the suggestion robot and the other collaborators. A suggested edit is only incorporated into the document once it has been accepted. However, the user interface may show a preview of how the suggested edit would look like if accepted. In this manner, method 700 describes a way to provide automated suggestions in a document stored on a cloud computing service.

Figure 8:
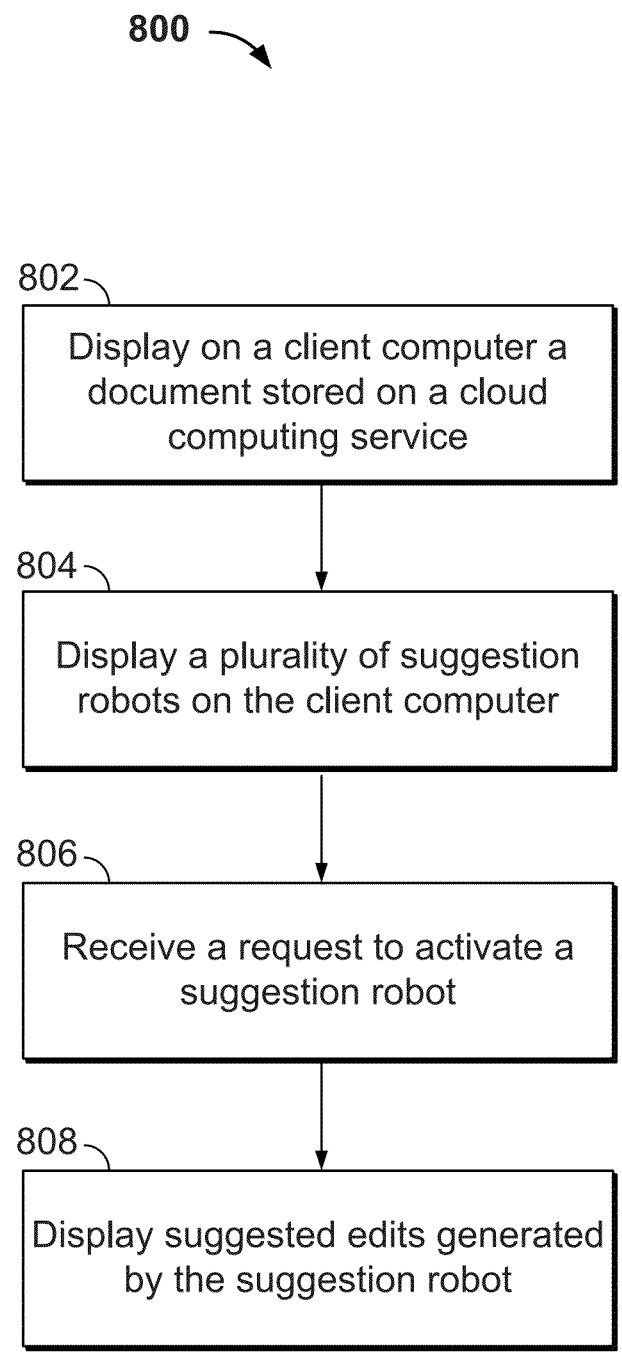
FIG. 8 shows a method for requesting automated suggestions in a document stored on a cloud computing service in accordance with an implementation as described herein.

While method 700 describes a method for a cloud computing service to provide automated suggestions in a document, method 800 in FIG. 8 describes a method for a client computer to request automated suggestions for a document stored on a cloud computing service. Method 800 includes displaying, to a first collaborator on a client computer, a document stored on a cloud computing service, where one or more collaborators may insert suggested edits into the document. The method further includes displaying to the first collaborator a plurality of suggestion robots, where each of the plurality of suggestion robots has an associated editing objective, and receiving a request from the first collaborator to activate a first suggestion robot within the plurality of suggestion robots. The method further includes displaying a plurality of suggested edits of the document generated by the first suggestion robot according to the editing objective of the first suggestion robot, where the plurality of suggested edits by the first suggestion robot are displayed with any suggested edits by the one or more collaborators and the first collaborator may accept or reject each of the plurality of suggested edits of the first suggestion robot and the one or more collaborators. Method 800 may be performed on any client computer, such as client computers 104a through 104d in FIG. 1, client computer 218 in FIG. 2, and client computer 604 in FIG. 6.

Method 800 begins when a client computer displays to a collaborator a document stored on a cloud computing service, shown at 802. The client computer communicates with the cloud computing service through a remote network, such as the Internet. The cloud computing service stores a document editing application that executes within a web browser on the client computer to display the document to the collaborator. Alternatively, the document editing application may be a stand-alone application that executes on the client computer without the need for a web browser. The document stored may be a word processing document, spreadsheet, presentation, or any other electronic file. One or more other collaborators may access the document and insert suggested edits into the document. Suggested edits are edits that are not incorporated into the document until a user accepts them. However, the user interface may show a preview of how the suggested edit would look like if accepted. An example of a suggested edit generated by a collaborator is shown in FIG. 3, and the display of the suggested edit in the document editing application may include the suggested edit, the person who suggested the edit, and accept and reject options. The document has an access control list that controls the level of access each collaborator has to the document. For example, if a collaborator has creator, editor, or commenter access then the collaborator may insert suggested edits in the document. Collaborators with only viewing access may not insert or view suggested edits.

A plurality of suggestion robots are displayed to the collaborator on the client computer shown at 804. Each suggestion robot generates suggested edits for a document according to an associated editing objective. Examples of editing objectives include spelling and grammar in various languages, improvement of wording, consistency within the document, creating shortcuts in a document, adding web links to a document, formatting, visual style, color schemes, inserting images associated with words, fact checking, bibliography checking, inviting additional human reviewers based on mention of their names, suggestions for particular styles of prose or poetry, and humorous suggestions. The suggestion robots may be stored on the cloud computing service or stored on a third-party server. The suggestion robots may be programmed in Javascript or other browser-compatible languages, or may be programmed as modules in Java, C++, and any other languages executable on a server. The suggestion robots may also be written in the native code of certain mobile devices. The suggestion robot may be designed with hard-coded heuristics to generate suggested edits, or may use machine learning to train the robot on a corpus of documents. The suggestion robots may consult external sources to generate the suggested edits, and may also keep track of the user's acceptance and rejection patterns. The user interface of the document editing application displays options for the collaborators to activate any of the suggestion robots. An example of a user interface for displaying, searching, and browsing the suggestion robots to collaborators is shown in FIG. 4.

A collaborator may request the activation of a first suggestion robot in the plurality of suggestion robots by selecting it on the user interface. Alternatively, a collaborator may activate a suggestion robot through other means, such as sending the document to an e-mail address associated with the suggestion robot. The client computer receives the request from collaborator to activate the first suggestion robot, shown at 806. The client computer sends this request to the cloud computing service, which activates the suggestion robot in the document. For example, if the editing objective of the first suggestion robot is to convert all verbs into present tense, then the suggested edits may be instances where the suggestion robot has found past and future verb tenses and suggests the present tense for those verbs. The first suggestion robot may be executed on the cloud computing service and the plurality of suggested edits are sent to the client computer for display, or a copy of the suggestion robot may be sent to the client computer for execution. If the first suggestion robot is stored on a third-party server, it may be executed on the third-party server and the plurality of suggested edits are sent to the client computer for display.

After the client computer receives a plurality of suggested edits from the first suggestion robot, the client computer displays the suggested edits of the collaborator, shown at 808. The plurality of suggested edits generated by the suggestion robot is displayed along with any suggested edits by collaborators. The display of the plurality of suggested edits may have the same appearance as the display of suggested edits by the other collaborators, such as shown in FIG. 5. From the collaborator's perspective, suggested edits made by a suggestion robot are no different than suggested edits made by human collaborators. A suggested edit may have multiple alternatives that the collaborator selects from. In addition, the collaborator may accept or reject each of the plurality of suggested edits of the suggestion robot and the other collaborators. A suggested edit is only incorporated into the document once it has been accepted. However, the user interface may show a preview of how the suggested edit would look like if accepted. In this manner, method 900 describes a way to request automated suggestions in a document stored on a cloud computing service.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing automated suggestions in a document stored on a cloud computing service, the method comprising:
    storing a document on a cloud computing service;
    providing one or more collaborators with access to the document, wherein the one or more collaborators may insert suggested edits into the document;
    providing a plurality of suggestion robots for the one or more collaborators to activate within the document, wherein each of the plurality of suggestion robots has an associated editing objective that is associated with an editing objective category;
    receiving a request from a first collaborator on a client computer to activate a first suggestion robot within the plurality of suggestion robots; and
    activating the first suggestion robot to present to the first collaborator a plurality of suggested edits of the document according to the editing objective of the first suggestion robot, wherein:
        the plurality of suggested edits by the first suggestion robot are displayed with any suggested edits by the one or more collaborators;
        the first collaborator may accept or reject each of the plurality of suggested edits of the first suggestion robot and the one or more collaborators; and
        storing an acceptance and rejection pattern of the first collaborator in document metadata on the cloud computing service, wherein the first suggestion robot uses the acceptance and rejection pattern of the first collaborator to generate the plurality of suggested edits;
    wherein the suggestion robot invites an additional reviewer to access the document based on the inclusion of the reviewer's name in the document.

2. The method of claim 1, wherein the display of the plurality of suggested edits by the first suggestion robot have the same appearance as the display of suggested edits by the one or more collaborators.

3. The method of claim 1, wherein a first suggested edit in the plurality of suggested edits is incorporated into the document when the first collaborator accepts the first suggested edit.

4. The method of claim 1, wherein the first suggestion robot is executed on the cloud computing service and the plurality of suggested edits are sent to the client computer for display.

5. The method of claim 1, wherein activating the first suggestion robot includes sending a copy of the first suggestion robot to the client computer and executing the first suggestion robot on the client computer.

6. The method of claim 1, wherein the first suggestion robot is stored on a third-party server, and the cloud computing service sends an acceptance and rejection pattern of the first collaborator to the third-party server.

7. The method of claim 6, wherein activating the first suggestion robot includes executing the first suggestion robot on the third-party server and providing the plurality of suggested edits to the client computer for display.

8. The method of claim 1, wherein the first collaborator activates the first suggestion robot to provide the plurality of suggested edits for a portion of the document.

9. The method of claim 1, wherein the first collaborator activates the first suggestion robot to provide the plurality of suggested edits for the document and an additional one or more documents stored on the cloud computing service.

10. The method of claim 1, wherein the cloud computing service provides the client computer with a document editing application for displaying the document, the plurality of suggestion robots, and the plurality of suggested edits to the first collaborator.

11. The method of claim 1, wherein the first collaborator requests activation of the first suggestion robot by sending the document to an e-mail address associated with the first suggestion robot.

12. The method of claim 1, providing a first suggestion robot with a first associated editing objective within a first editing objective category and a second suggestion robot with a second associated editing objective within the first editing objective category, wherein:
    the first editing objective and the second editing objective are opposing.

13. A method to request automated suggestions in a document stored on a cloud computing service, the method comprising:
    displaying, to a first collaborator on a client computer, a document stored on a cloud computing service, wherein one or more collaborators may insert suggested edits into the document;
    displaying to the first collaborator a plurality of suggestion robots, wherein each of the plurality of suggestion robots has an associated editing objective that is associated with an editing objective category;
    receiving a request from the first collaborator to activate a first suggestion robot within the plurality of suggestion robots; and displaying a plurality of suggested edits of the document generated by the first suggestion robot according to the editing objective of the first suggestion robot, wherein:
the plurality of suggested edits by the first suggestion robot are displayed with any suggested edits by the one or more collaborators;
the first collaborator may accept or reject each of the plurality of suggested edits of the first suggestion robot and the one or more collaborators; and
storing an acceptance and rejection pattern of the first collaborator in document metadata on the cloud computing service, wherein the first suggestion robot uses the acceptance and rejection pattern of the first collaborator to generate the plurality of suggested edits;
wherein the suggestion robot invites an additional reviewer to access the document based on the inclusion of the reviewer's name in the document.

14. The method of claim 13, wherein the display of the plurality of suggested edits by the first suggestion robot have the same appearance as the display of suggested edits by the one or more collaborators.

15. The method of claim 13, wherein a first suggested edit in the plurality of suggested edits is incorporated into the document when the first collaborator accepts the first suggested edit.

16. The method of claim 13, wherein the first suggestion robot is executed on the cloud computing service and the plurality of suggested edits are sent to the client computer for display.

17. The method of claim 13, wherein displaying the plurality of suggested edits includes sending a copy of the first suggestion robot to the client computer and executing the first suggestion robot on the client computer.

18. The method of claim 13, wherein the first suggestion robot is stored on a third-party server, and the cloud computing service sends an acceptance and rejection pattern of the first collaborator to the third-party server.

19. The method of claim 18, wherein displaying the plurality of suggested edits includes executing the first suggestion robot on the third-party server and providing the plurality of suggested edits to the client computer for display.

20. The method of claim 13, wherein the first collaborator activates the first suggestion robot to provide the plurality of suggested edits for a portion of the document.

21. The method of claim 13, wherein the first collaborator activates the first suggestion robot to provide the plurality of suggested edits for the document and an additional one or more documents stored on the cloud computing service.

22. The method of claim 13, wherein the cloud computing service provides the client computer with a document editing application for displaying the document, the plurality of suggestion robots, and the plurality of suggested edits.

23. The method of claim 13, wherein the first collaborator requests activation of the first suggestion robot by sending the document to an e-mail address associated with the first suggestion robot.

24. An apparatus for providing automated suggestions in a document stored on a cloud computing service, the apparatus comprising:
a server, comprising a memory, configured to:
communicate with a user and one or more collaborators on a plurality of client computers;
store a document;
provide the user and one or more collaborators with access to the document, wherein the one or more collaborators may insert suggested edits into the document;
provide a plurality of suggestion robots for the user to activate within the document, wherein each of the plurality of suggestion robots has an associated editing objective that is associated with an editing objective category;
receive a request from the user on a first client computer in the plurality of client computers to activate a first suggestion robot within the plurality of suggestion robots; and
activate the first suggestion robot to present to the user a plurality of suggested edits of the document according to the editing objective of the first suggestion robot, wherein:
the plurality of suggested edits by the first suggestion robot are displayed with any suggested edits by the one or more collaborators;
the user may accept or reject each of the plurality of suggested edits of the first suggestion robot and the one or more collaborators; and
storing an acceptance and rejection pattern of the first collaborator in document metadata on the cloud computing service, wherein the first suggestion robot uses the acceptance and rejection pattern of the first collaborator to generate the plurality of suggested edits;
wherein the suggestion robot invites an additional reviewer to access the document based on the inclusion of the reviewer's name in the document.

25. The apparatus of claim 24, wherein the display of the plurality of suggested edits by the first suggestion robot have the same appearance as the display of suggested edits by the one or more collaborators.

26. The apparatus of claim 24, wherein the server is further configured to execute the first suggestion robot and send the plurality of suggested edits to the first client computer for display.

27. The apparatus of claim 24, wherein the server is further configured to send a copy of the first suggestion robot to the first client computer for execution on the client computer.

28. The apparatus of claim 24, wherein the user activates the first suggestion robot to provide the plurality of suggested edits for a portion of the document.

29. The apparatus of claim 24, wherein the user activates the first suggestion robot to provide the plurality of suggested edits for the document and an additional one or more documents stored on the server.

30. The apparatus of claim 24, the server further configured to provide the first client computer with a document editing application for displaying the document, the plurality of suggestion robots, and the plurality of suggested edits to the user.

31. The apparatus of claim 24, wherein the user requests activation of the first suggestion robot by sending the document to an e-mail address associated with the first suggestion robot.

32. A system for providing automated suggestions in a document stored on a cloud computing service, the system comprising:
a plurality of client computers; and
a server configured to:
communicate with the plurality of client computers;
store a document;
provide a user and one or more collaborators on the plurality of client computers with access to the document, wherein the one or more collaborators may insert suggested edits into the document;
provide a plurality of suggestion robots for the user to activate within the document, wherein each of the plurality of suggestion robots has an associated editing objective that is associated with an editing objective category;

receive a request from the user on a first client computer in the plurality of client computers to activate a first suggestion robot within the plurality of suggestion robots; and activate the first suggestion robot to present to the user a plurality of suggested edits of the document according to the editing objective of the first suggestion robot, wherein:

the plurality of suggested edits by the first suggestion robot are displayed with any suggested edits by the one or more collaborators;

the user may accept or reject each of the plurality of suggested edits of the first suggestion robot and the one or more collaborators; and storing an acceptance and rejection pattern of the first collaborator in document metadata on the cloud computing service, wherein the first suggestion robot uses the acceptance and rejection pattern of the first collaborator to generate the plurality of suggested edits;

wherein the suggestion robot invites an additional reviewer to access the document based on the inclusion of the reviewer's name in the document.

33. The system of claim 32, wherein the display of the plurality of suggested edits by the first suggestion robot have the same appearance as the display of suggested edits by the one or more collaborators.

34. The system of claim 32, the server further configured to provide the first client computer with a document editing application for displaying the document, the plurality of suggestion robots, and the plurality of suggested edits to the user.

* * * * *